(12) United States Patent
Lee

(10) Patent No.: US 9,732,837 B2
(45) Date of Patent: Aug. 15, 2017

(54) IDLE GEAR ASSEMBLY

(71) Applicant: HYUNDAI MOTOR COMPANY, Seoul (KR)

(72) Inventor: Ahn Lee, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 73 days.

(21) Appl. No.: 14/958,590

(22) Filed: Dec. 3, 2015

(65) Prior Publication Data

US 2016/0230870 A1   Aug. 11, 2016

(30) Foreign Application Priority Data

Feb. 9, 2015  (KR) .................. 10-2015-0019450
Apr. 8, 2015  (KR) .................. 10-2015-0049879

(51) Int. Cl.
| | |
|---|---|
| F16H 1/06 | (2006.01) |
| F16H 55/14 | (2006.01) |
| F16F 15/26 | (2006.01) |
| F16H 1/08 | (2006.01) |
| F16H 1/20 | (2006.01) |
| F16H 55/18 | (2006.01) |

(52) U.S. Cl.
CPC ........... *F16H 55/14* (2013.01); *F16F 15/264* (2013.01); *F16F 15/267* (2013.01); *F16H 1/06* (2013.01); *F16H 1/08* (2013.01); *F16H 1/206* (2013.01); *F16H 55/18* (2013.01)

(58) Field of Classification Search
CPC ........ F16F 15/264; F16F 15/267; F16H 1/06; F16H 1/08; F16H 1/20; F16H 1/206

USPC .................. 123/192.2; 73/392, 414
See application file for complete search history.

(56) References Cited

U.S. PATENT DOCUMENTS

| | | | | |
|---|---|---|---|---|
| 4,802,450 A | * | 2/1989 | Roberts ................. | F16F 15/264 123/192.2 |
| 5,960,761 A | * | 10/1999 | Kawakubo ............. | F02B 61/02 123/192.2 |
| 6,715,376 B2 | * | 4/2004 | Hojyo ..................... | B62M 7/00 123/192.2 |
| 9,631,697 B2 | * | 4/2017 | Sotani .................... | F16F 15/264 |

(Continued)

FOREIGN PATENT DOCUMENTS

| | | |
|---|---|---|
| JP | H08-28661 A | 2/1996 |
| JP | H09-329193 A | 12/1997 |

(Continued)

*Primary Examiner* — Erick Solis
(74) *Attorney, Agent, or Firm* — McDermott Will & Emery LLP

(57) ABSTRACT

An idle gear assembly comprises an outer ring having gear teeth formed on an external surface thereof and engaged with a crank gear and any one of the left and right balance gears. A bearing includes an inner member and an outer member in a radial direction of the bearing and a plurality of rolling bodies disposed between the inner member and the outer member. A ring has elasticity in a radial direction thereof. A hub has a flange, which is in contact with the bearing, and a penetration hole. The flange and the penetration hole are formed at one side of the hub in an axial direction. A nut is inserted through another side and mounted at a hollow portion of the ring. A bolt is inserted through the insertion hole of the bearing, the penetration hole, and the nut and fixes the bearing and the hub.

13 Claims, 8 Drawing Sheets

(56) References Cited

U.S. PATENT DOCUMENTS

| | | | |
|---|---|---|---|
| 2007/0238571 A1* | 10/2007 | Sugitani | F16C 19/50 475/227 |
| 2014/0060474 A1* | 3/2014 | Ohno | F16H 57/0006 123/192.2 |
| 2017/0023103 A1* | 1/2017 | Liu | F16H 1/20 |
| 2017/0097083 A1* | 4/2017 | Dumanski | F16H 57/0006 |

FOREIGN PATENT DOCUMENTS

| | | |
|---|---|---|
| JP | 2001-032903 A | 2/2001 |
| JP | 2007-239521 A | 9/2007 |
| JP | 2010-077956 A | 4/2010 |
| JP | 4984093 B2 | 7/2012 |
| KR | 20-0332350 Y1 | 11/2003 |
| KR | 10-2012-0054132 A | 5/2012 |

\* cited by examiner

IDLE GEAR ASSEMBLY

CROSS-REFERENCE TO RELATED APPLICATION

The present application claims the benefit of priority to Korean Patent Application Number 10-2015-0019450 filed on Feb. 9, 2015 and 10-2015-0049879 filed on Apr. 8, 2015, the entire contents of which application are incorporated herein for all purposes by this reference.

TECHNICAL FIELD

The present disclosure relates to an idle gear assembly, and more particularly, to an idle gear assembly properly controlling backlash, reducing gear noise and improving mountability to an engine.

BACKGROUND

An engine has a balance shaft module (BSM) for dampening vibrations of the engine. The BSM has an idle gear assembly.

FIG. 1 is a perspective view of an engine having a BSM and an idle gear assembly.

Referring to FIG. 1, a BSM includes two balance shafts parallel to each other, and the balance shafts may be parallel to a crankshaft.

The two balance shafts respectively include balance gears 1 and 2.

The balance gears are a left balance gear 1 and a right balance gear 2.

At least one of the left and right balance gears 1 and 2 may be driven by being connected to the crankshaft with a chain or a gear.

In FIG. 1, the left balance gear 1 is driven by being gear-connected with a crank gear 3 mounted to the crankshaft.

To left and right balance shafts, balance weights may be mounted respectively, and the left and right balance gears 1 and 2 need to respectively rotate in opposite directions for balancing out vibrations of an engine.

An idle gear assembly 100 is disposed and engaged between a crank gear 3 and any one of left and right balance gears 1 and 2 such that the left and right balance gears 1 and 2 respectively rotate in opposite directions.

In FIG. 1, an idle gear assembly 100 is mounted between right balance gear 2 and a crank gear 3.

In the engine having a BSM, coated gears may be used for controlling backlash.

In order to control the backlash between the gears by using thickness of backlash control coating, the gears must be assembled in a condition of zero backlash at initial assembly of the gears with coating layer in between, and backlash control coating must vanish by abrasion in a short period of time while the engine operates and forms the backlash between gears.

If the backlash is not effectively controlled, abrasion and noise of the gears may be generated, more energy of driving gears is consumed than that in case of proper backlash control, and fuel consumption is deteriorated.

In addition, mounting problem may occur between a tool and an engine compartment, depending on a mounting position, when an idle gear assembly 100 is mounted to an engine.

For example, a jig space is necessary for fixing, when the idle gear assembly 100 is fixedly mounted inside a cylinder block.

Therefore, a mounting space of the idle gear assembly 100 may deteriorate the engine room compartment due to relations of position with other parts.

The above information disclosed in this Background section is only for enhancement of understanding of the background of the invention, and therefore, it may contain information that does not form the prior art that is already known in this country to a person of ordinary skill in the art.

SUMMARY

Various aspects of the present inventive concept are directed to providing an idle gear assembly effectively controlling backlash, reducing gear noise, and improving mountability and maintainability of an engine.

According to an exemplary embodiment of the present inventive concept, an idle gear assembly may comprise an outer ring having a hollow cylindrical shape and having gear teeth formed on an external surface of the outer ring. The gear teeth are engaged with a crank gear and any one of the left and right balance gears of a balance gear shaft (BSM). A bearing includes an inner member and an outer member in a radial direction of the bearing. The inner member has an insertion hole formed at a center portion of the inner member. The outer member relatively rotates with respect to the inner member and is fixedly mounted at a hollow portion of the outer ring. A plurality of rolling bodies are disposed between the inner member and the outer member. A ring has a hollow cylindrical shape and elasticity in a radial direction of the ring. A hub has a hollow cylindrical shape, an internal surface of which the ring is inserted into, and has a flange that makes contact with the bearing, and a penetration hole. The flange and the penetration hole are formed at one side of the hub in an axial direction. A nut is inserted through another side of the hub in the axial direction and mounted at a hollow portion of the ring. A bolt is inserted sequentially through the insertion hole of the bearing, the penetration hole of the hub, and the nut and fixes the bearing and the hub to each other.

The bolt may include a guide portion inserted into the insertion hole and a thread portion having threads and coupled to the nut. A fixing hole may be formed at an end of the thread portion in a length direction of the bolt.

The fixing hole may be a hexagonal hole.

The hub may have an assembly hole off centered with a geometric center which is determined by a gear engagement of the outer ring on a plane perpendicular to an axial direction of the crank gear after mounting the idle gear assembly between the crank gear and the any one of the left and right gears.

The hub may be fixedly mounted to a cylinder block at which no relative displacement is generated with respect to the crank gear.

The assembly center of the hub may have an off-center direction from the geometric center of the outer ring towards a connecting line which connects a center point of the any one of the left and right balance gears and a center point of the crank gear on the plane perpendicular to the axial direction of the crank gear.

The off-center direction of the assembly center of the hub may be perpendicular to the connecting line.

The ring may be made of a rubber material.

The ring may be pressed into the hub.

An inner diameter of the ring may be equal to or smaller than an outer diameter of the nut.

The flange may have circular ring shape and protrude in the axial direction of the hub. A fixing surface may be formed at one side of the flange and perpendicular to the axial direction of the hub.

The fixing surface of the flange may be in contact with a vertical surface of the inner member. The vertical surface may be perpendicular to the axial direction of the hub.

DETAILED DESCRIPTION

Reference will now be made in detail to various embodiments of the present inventive concept, examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents, and other embodiments, which may be included within the spirit and scope of the invention as defined by the appended claims.

In addition, unless explicitly described to the contrary, the word "comprise" and variations such as "comprises" or "comprising" will be understood to imply the inclusion of stated elements but not the exclusion of any other elements and the name of a component doesn't set limits to the function of the component concerned.

Figure 1:
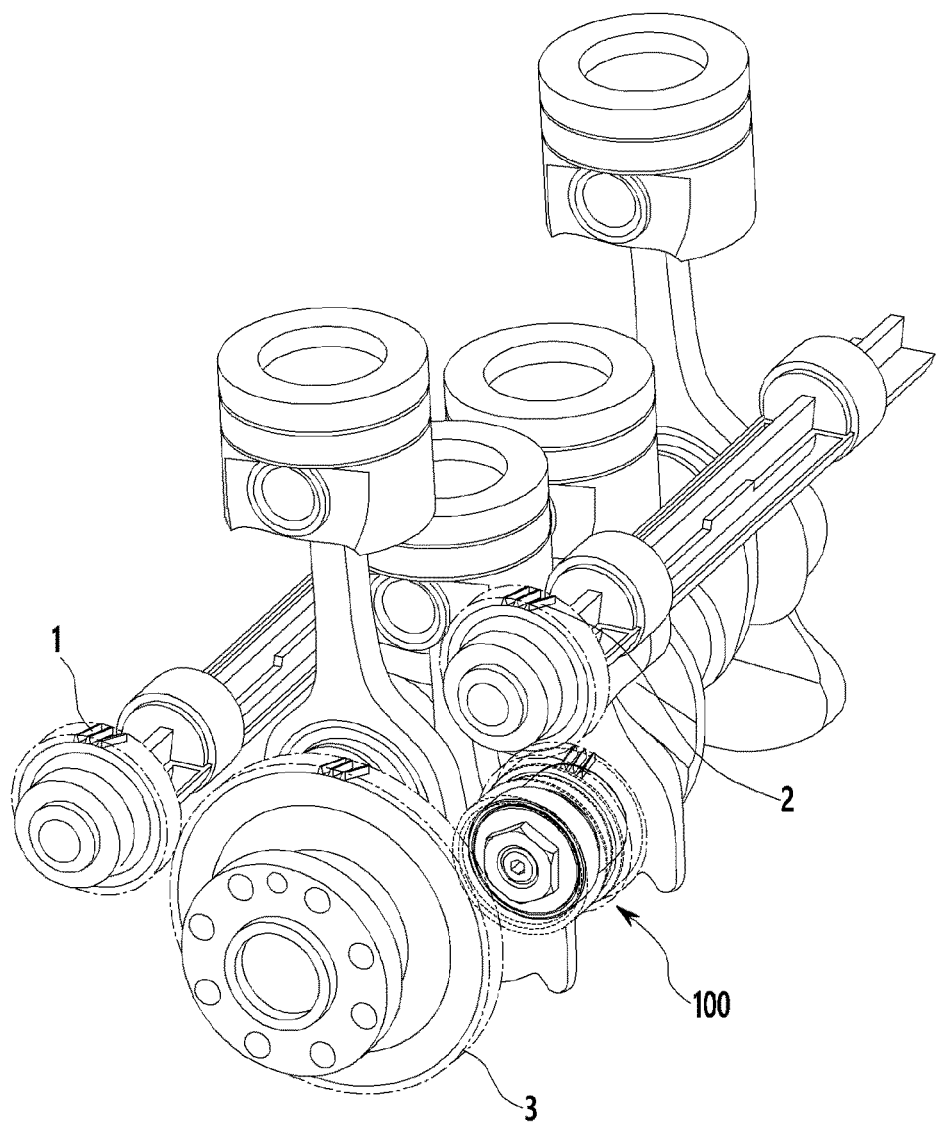
FIG. 1 is a perspective view of an engine system equipped with a balance shaft module (BSM) and an idle gear assembly according to a related art.
Figure 2:
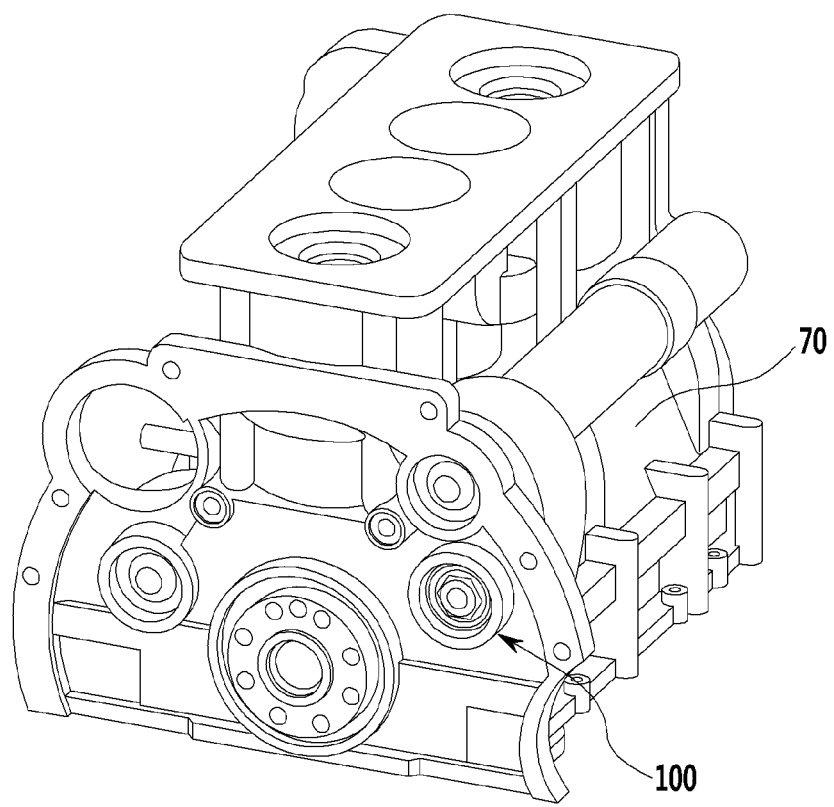
FIG. 2 is a perspective view showing an appearance of an exemplary engine system according to the present disclosure.

FIG. 2 is a perspective view illustrating an exemplary engine system according to the present disclosure.

Figure 3:
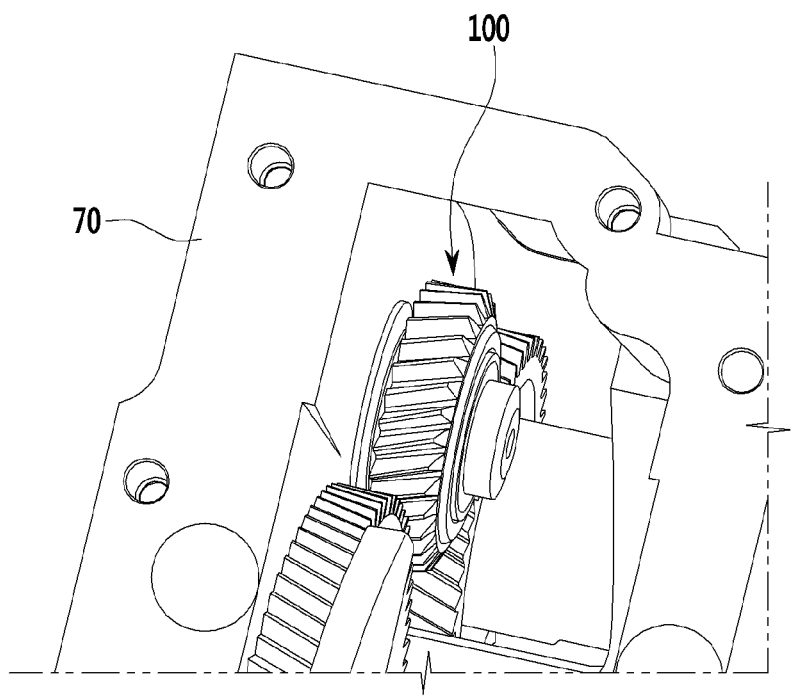
FIG. 3 is a perspective view illustrating a figure in which an idle gear assembly is mounted inside an exemplary cylinder block according to the present disclosure.

FIG. 3 is a perspective view illustrating an idle gear assembly mounted inside an exemplary cylinder block according to the present disclosure.

Referring to FIGS. 2 and 3, an idle gear assembly 100 may be mounted inside a cylinder block 70.

FIG. 3 illustrates that the idle gear assembly 100 has a tool entry space.

In general, tools are used at both inner side and outer side of the cylinder block 70, so that the idle gear assembly 100 is mounted inside the cylinder block 70.

Therefore, if the idle gear assembly 100 may be mounted by tools being used at only one side, particularly at only an outer side of the cylinder block 70 and mountability of the idle gear assembly 100 is largely improved, thus increasing efficiency of engine compartment space.

Figure 4:
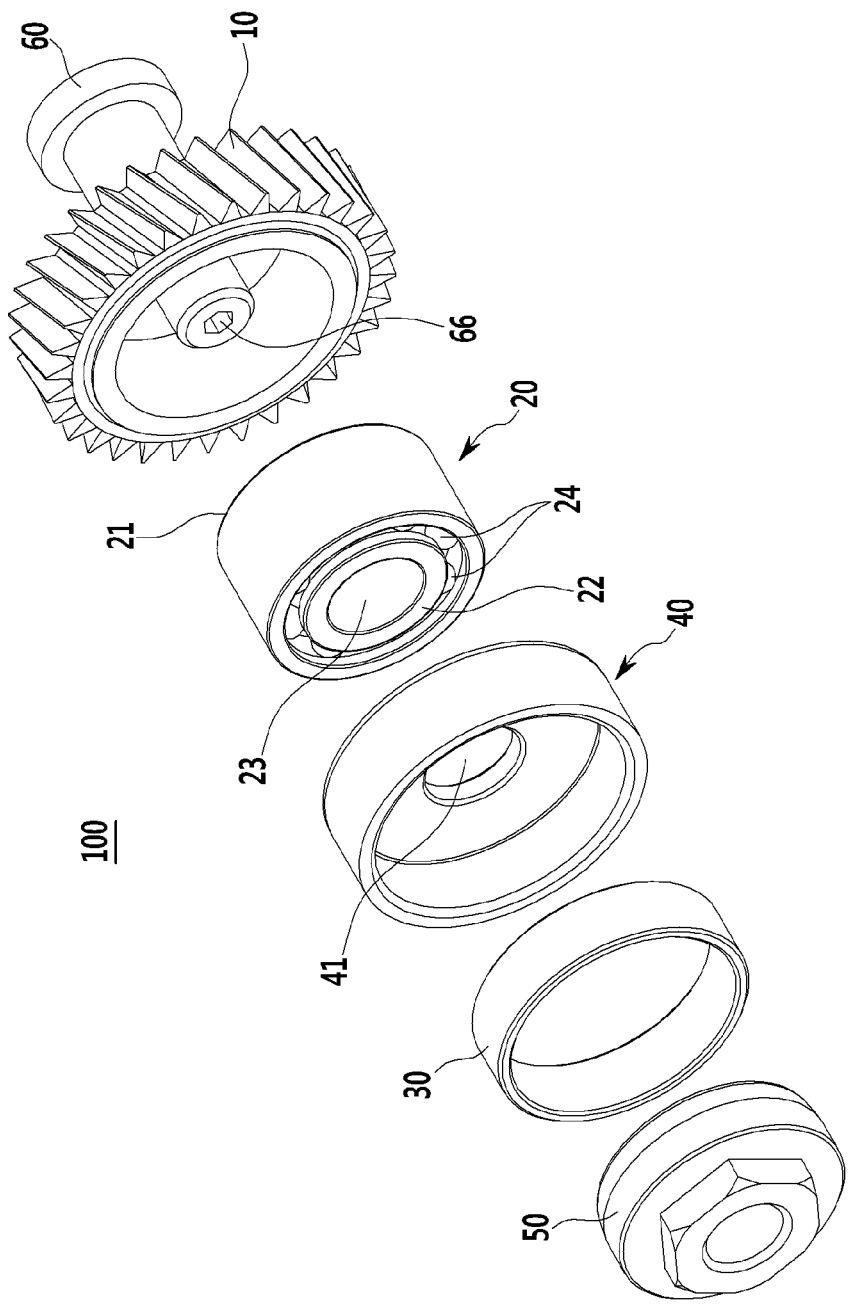
FIG. 4 is an exploded perspective view of an exemplary idle gear assembly according to the present disclosure.
Figure 5:
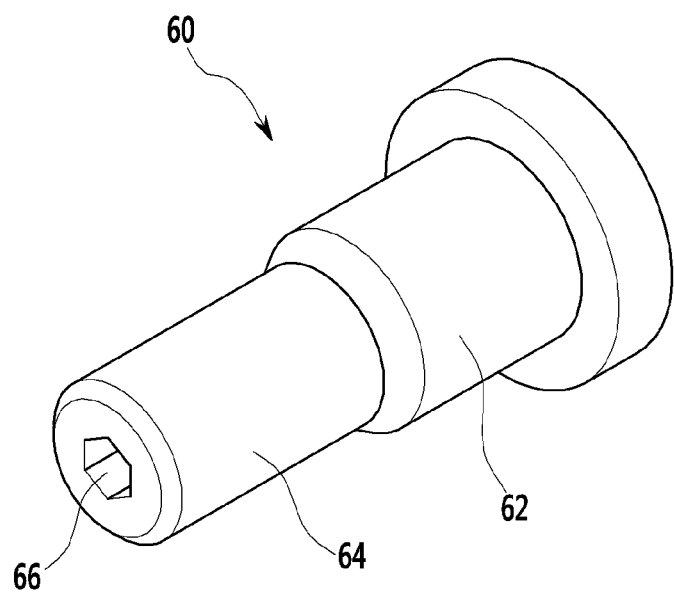
FIG. 5 is a perspective view of an exemplary bolt according to the present disclosure.
Figure 6:
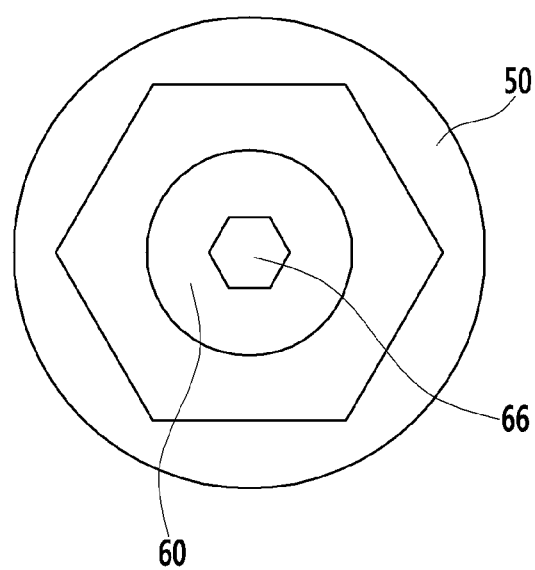
FIG. 6 is a front view of a coupling structure of exemplary bolt and nut according to the present disclosure.
Figure 7:
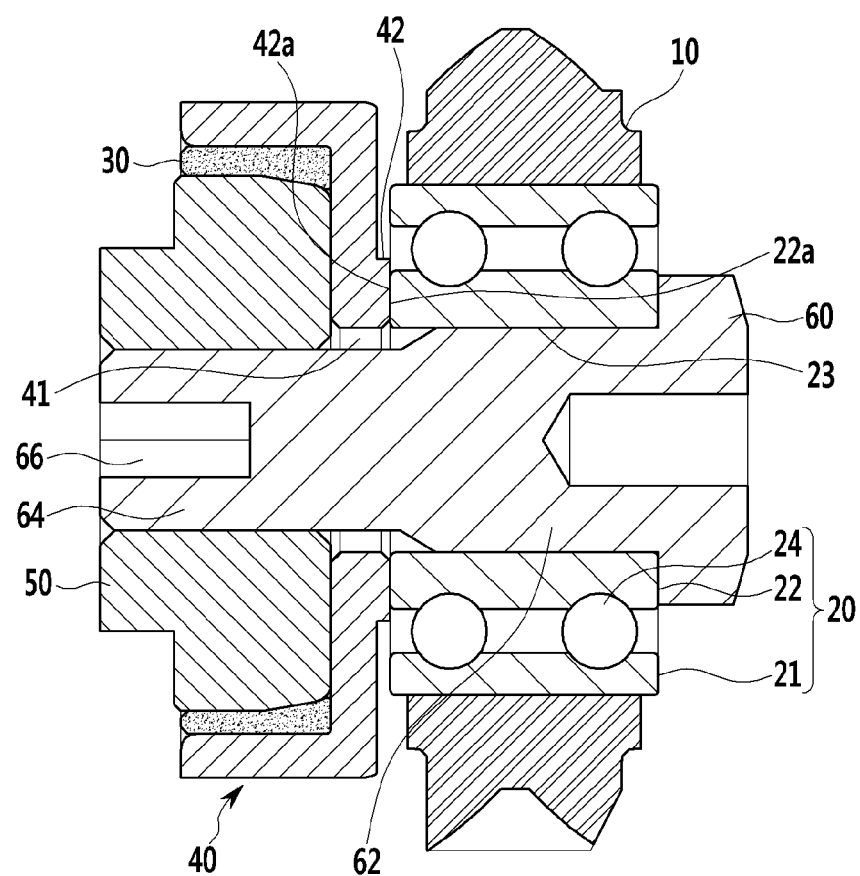
FIG. 7 is a cross-sectional view in an axial direction of an exemplary idle gear assembly according to the present disclosure.

FIG. 4 is an exploded perspective view of an exemplary idle gear assembly according to the present disclosure. FIG. 5 is a perspective view of an exemplary bolt according to the present disclosure. FIG. 6 is a front view of a coupling structure of exemplary bolt and nut according to the present disclosure. FIG. 7 is a cross-sectional view in an axial direction of an exemplary idle gear assembly according to the present disclosure.

Referring to FIGS. 4 and 7, an exemplary idle gear assembly 100 according to the present disclosure are disposed and engaged between a crank gear 3 and any one of left and right balance gears 1, 2 so that rotational directions of the crank gear 3 and the any one of the left and right balance gears 1, 2 are equalized.

Accordingly, the left and right balance gears 1, 2 rotate in opposite directions with respect to each other.

The idle gear assembly 100 may comprise an outer ring 10 having a hollow cylindrical shape and having gear teeth on an external surface of the outer ring 10. The gear teeth are engaged with the crank gear 3 and the any one of the left and right balance gears 1, 2. A bearing 20 includes an inner member 22 in a radial direction of the bearing 20. The inner member 22 has an insertion hole 23 formed at a center portion of the inner member 22, an outer member 21 in the radial direction of the bearing 20. The outer member 21 relatively rotates with respect to the inner member 22 and is fixedly mounted at a hollow portion of the outer ring 10. A plurality of rolling bodies 24 are disposed between the inner member 22 and the outer member 21. A ring 30 has a hollow cylindrical shape and elasticity in a radial direction of the ring 30. A hub 40 has a hollow cylindrical shape, into which an internal surface of which the ring 30 inserted, and has a flange 42 that is in contact with the bearing 20, and a penetration hole 41 formed at one surface in an axial direction of the hub 40. A nut 50 is inserted through another side in the axial direction of the hub 40 and mounted at a hollow portion of the ring 30. A bolt 60 is inserted through the insertion hole 23 of the bearing 20, the penetration hole 41 of the hub 40, and the nut 50 sequentially and fixes the bearing 20 and the hub 40 to each other.

Referring to FIGS. 5 and 6, the bolt 60 may include a guide portion 62 inserted into the insertion hole 23 and a thread portion 64 having threads and coupled to the nut 50.

A fixing hole 66 may be formed at an end of the thread portion 64 in a length direction of the bolt 60.

When the idle gear assembly 100 is mounted to the engine, the mounting is completed by coupling the nut 50 to the thread portion 64, after the bolt 60 is fixed in a rotating direction by inserting a tool into the fixing hole 66.

Accordingly, tools need to be put into both sides of the idle gear assembly 100 in a length direction thereof to tighten the idle gear assembly 100.

Mountability and maintainability are improved because the idle gear assembly 100 can be mounted by a tool being put into only one side.

The fixing hole 66 may be a hexagonal hole or a torx-shaped hole.

With the fixing hole 66, the bolt 60 can be fixed with respect to a rotating direction using a fixing tool well-known to a person skilled in the art.

FIG. 6 shows that the fixing hole 66 may have a hexagonal shape.

Figure 8:
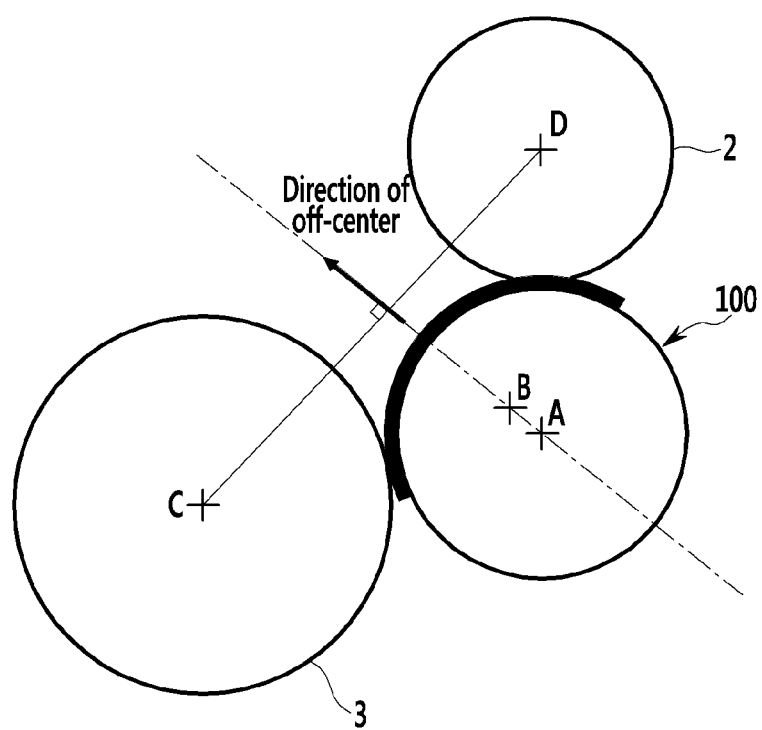
FIG. 8 is a schematic diagram illustrating position relations of gears and a mounting structure in case of an exemplary idle gear assembly according to the present disclosure being mounted.

FIG. 8 is a schematic diagram illustrating position relations of gears and a mounting structure in case of an exemplary idle gear assembly according to the present disclosure being mounted.

Referring to FIG. 8, an assembly center B of the idle gear assembly 100 may be off centered with a geometric center A determined by a gear engagement of the outer ring 10, on a plane perpendicular to an axial direction of the crank gear 3, when mounting the idle gear assembly 100 between the crank gear 3 and the any one of the left and right gears 1, 2 finishes.

In FIG. 8, a direction of off-center is illustrated.

Here, the assembly center B of the idle gear assembly 100 means an actual center of the hub 40, positioned on a plane perpendicular to an axial direction of the crank gear 3 after mounting of the idle gear assembly 100 is completed by tightening of the bolt 60.

The geometric center A of the idle gear assembly 100, that is, the geometric center A of the hub 40 means a theoretical center of the hub 40, causing gear teeth of the idle gear assembly 100 to be geometrically engaged between the crank gear 3 and the any one of the left and right balance gears 1, 2, with no force acting on the gears.

Therefore, when mounting of the idle gear assembly 100 is completed by tightening of the bolt 60, a contacting force in the direction of off-center becomes to act on gear teeth of the outer ring 10, if the assembly center B of the hub 40 is off centered from the geometric center A towards an arrow direction of FIG. 8.

When the assembly center B of the hub 40 is off centered in a height direction of FIG. 7, the flange 42 of the hub 40 makes contact with the inner member 22 of the bearing 20 and becomes fixed strongly when the bolt 60 is tightened.

The hub 40 doesn't move because it is fixedly mounted to such a fixed portion of the engine as a cylinder block, and the outer ring 10, at which the bearing 20 is mounted, moves a bit in the height direction.

Accordingly, the gear teeth of the outer ring 10 become to contact towards the crank gear 3 and the any one of the left and right balance gears 1, 2 Since the assembly center B of the hub 40 is off centered such that the assembly center B is positioned at a higher portion than the geometric center A in the height direction of FIG. 7.

For reasons mentioned above, the contacting force acts on the gear teeth of the outer ring 10 all the time while the gears operate.

Therefore, the idle gear assemblies according to the present disclosure become able to properly control backlash by adjusting quantity of off-center.

Referring to FIG. 7, a lower portion of the ring 30 in a height direction thereof is pressed and becomes thinner than an upper portion.

This shows a condition in which a contacting force according to the off-center is acting on account of the hub 40 and the bearing 20 strongly fixed to each other in an axial direction.

In other words, the contacting force applies on an upper side in a height direction because the ring 30 having elasticity is compressed towards a lower side in the height direction.

The ring 30 may be made of a rubber material, but exemplary embodiments are not limited to the rubber material, and any material can be used for the ring 30 if it has elasticity.

The hub 40 may be fixedly mounted to any housing portion (not shown) or the cylinder block 70, no relative displacement of which is generated with respect to the crank gear 3.

Accordingly, the hub 40 never moves with respect to the crank gear 3, and the outer ring 10 comes close towards and makes contact with the crank gear 3 and the balance gears 1 or 2 when the bolt 60 is tightened completely.

An off-center direction of the assembly center B of the hub 40 may be a direction from the geometric center A of the outer ring 10 towards a connecting line connecting a center point of the any one of the left and right balance gears 1, 2 and a center point C of the crank gear 3, on a plane perpendicular to the axial direction of the crank gear 3.

In FIG. 8, the assembly center B is off centered in a direction coming near towards a connecting line CD connecting a center point D of a right balance gear 2, and a center point C of the crank gear 3 is illustrated.

As shown in FIG. 8, an off-center direction of the assembly center B of the hub 40 may be perpendicular to the connecting line.

The ring 30 may be pressed into the hub 40 or integrally have the hub 40.

In case of the ring 30 being integrally formed with the hub 40, assembly processes can be reduced.

An interior diameter of the ring 30 may be nearly equal to or smaller than an exterior diameter of the nut 50.

Through this, the ring 30 is well compressed in an opposite direction of a contacting direction of gear teeth of the outer ring 10, and thereby backlash can be effectively controlled.

Further, in the idle gear assembly 100 according to the present disclosure, the flange 42 may have a circular ring shape, the circular ring shape protruded in the axial direction of the hub 40 and a fixing surface 42a may be formed at one side of the flange 42, the fixing surface 42a perpendicular to the axial direction of the hub 40.

The fixing surface 42a of the flange 42 may make contact with a vertical surface 22a of the inner member 22, and the vertical surface 22a is a surface perpendicular to the axial direction of the hub 40.

By the contact of the fixing surface 42a and the vertical surface 22a, the bearing 20 and the hub 40 can be strongly coupled in an axial direction.

As explained in detail, gear noise of an engine system to which a BSM is applied is reduced, mountability and maintainability of the idle gear assembly are improved, and fuel consumption is also improved, according to the present invention.

While this invention has been described in connection with what is presently considered to be practical exemplary embodiments, it is to be understood that the invention is not limited to the disclosed embodiments.

On the contrary, it is intended to cover various modifications and equivalent arrangements included within the spirit and scope of the appended claims.

What is claimed is:

1. An idle gear assembly comprising:
    an outer ring having a hollow cylindrical shape and having gear teeth formed on an external surface of the outer ring, the gear teeth engaged with a crank gear and any one of the left and right balance gears of a balance gear shaft (BSM);
    a bearing including: an inner member in a radial direction of the bearing, the inner member having an insertion hole formed at a center portion of the inner member; an outer member in the radial direction of the bearing, the outer member relatively rotating with respect to the inner member and fixedly mounted at a hollow portion of the outer ring; and a plurality of rolling bodies disposed between the inner member and the outer member;

a ring having a hollow cylindrical shape and elasticity in a radial direction of the ring;

a hub having a hollow cylindrical shape such that the ring is inserted into an internal surface of the hub and having a flange that is in contact with the bearing and a penetration hole, in which the flange and the penetration hole are formed at one side of the hub in an axial direction;

a nut inserted through another side of the hub in the axial direction and mounted at a hollow portion of the ring; and a bolt inserted sequentially through the insertion hole of the bearing, the penetration hole of the hub, and the nut and fixing the bearing and the hub to each other, wherein the idle gear assembly disposed between the crank gear and the any one of left and right balance gears to equalize rotational directions of the crank gear and the any one of the left and right balance gears.

2. The idle gear assembly of claim 1, wherein the bolt includes: a guide portion inserted into the insertion hole; and a thread portion having threads and coupled to the nut, and
a fixing hole is formed at an end of the thread portion in a length direction of the bolt.

3. The idle gear assembly of claim 2, wherein the fixing hole has a hexagonal shape or a torx shape.

4. The idle gear assembly of claim 1, wherein an assembly center of the hub is off centered with a geometric center which is determined by gear engagement of the outer ring on a plane perpendicular to an axial direction of the crank gear after mounting the idle gear assembly between the crank gear and the any one of the left and right gears.

5. The idle gear assembly of claim 1, wherein the hub is fixedly mounted to a cylinder block at which no relative displacement is generated with respect to the crank gear.

6. The idle gear assembly of claim 4,
wherein the assembly center of the hub has an off-center direction from the geometric center of the outer ring towards a connecting line, which connects a center point of the any one of the left and right balance gears and a center point of the crank gear, on the plane perpendicular to the axial direction of the crank gear.

7. The idle gear assembly of claim 6, wherein the off-center direction of the assembly center of the hub is perpendicular to the connecting line.

8. The idle gear assembly of claim 1,
wherein the ring is made of a rubber material.

9. The idle gear assembly of claim 1, wherein the ring is pressed into the hub.

10. The idle gear assembly of claim 1, wherein an inner diameter of the ring is equal to or smaller than an outer diameter of the nut.

11. The idle gear assembly of claim 1, wherein the flange has a circular ring shape and protrudes in the axial direction of the hub, and
a fixing surface is formed at one side of the flange and perpendicular to the axial direction of the hub.

12. The idle gear assembly of claim 11, wherein the fixing surface of the flange is in contact with a vertical surface of the inner member, and
the vertical surface is perpendicular to the axial direction of the hub.

13. The idle gear assembly of claim 1, wherein the ring is integrally combined with the hub.

\* \* \* \* \*